United States Patent [19]
Antoun

[11] Patent Number: 5,893,973
[45] Date of Patent: Apr. 13, 1999

[54] HIGH EFFICIENCY BACKFLUSH SYSTEM FOR A FILTER

[76] Inventor: Gregory S. Antoun, Crawford County Industrial Park, Bldg. 2-10, Meadville, Pa. 16335

[21] Appl. No.: 08/917,196

[22] Filed: Aug. 25, 1997

[51] Int. Cl.$^6$ .................................................. B01D 29/68
[52] U.S. Cl. .......................... 210/411; 210/412; 210/117; 210/136; 210/541
[58] Field of Search ............................. 210/411, 412, 210/541, 117, 136

[56] References Cited

U.S. PATENT DOCUMENTS

| | | |
|---|---|---|
| 416,076 | 11/1889 | Rieck. |
| 2,338,417 | 1/1944 | Forrest. |
| 2,338,418 | 1/1944 | Forrest. |
| 3,061,102 | 10/1962 | Mayer. |
| 3,278,034 | 10/1966 | West. |
| 3,376,976 | 4/1968 | Wallen. |
| 3,567,032 | 3/1971 | Kemper. |
| 3,634,891 | 1/1972 | Kemper. |
| 3,984,326 | 10/1976 | Bendel. |
| 4,162,549 | 7/1979 | Charles. |
| 4,421,642 | 12/1983 | Kreitner. |
| 4,486,307 | 12/1984 | Weiler. |
| 4,937,005 | 6/1990 | Shelstad. |
| 5,078,873 | 1/1992 | Black et al.. |

FOREIGN PATENT DOCUMENTS

| | | |
|---|---|---|
| 1221197 | 7/1966 | Germany. |
| 1194450 | 11/1985 | U.S.S.R.. |
| 7550 | 1/1902 | United Kingdom. |
| 598816 | 2/1948 | United Kingdom. |

Primary Examiner—Thomas M. Lithgow
Attorney, Agent, or Firm—Richard C. Litman

[57] ABSTRACT

A high efficiency backflush filter apparatus positioned on the downstream side of a filter frame that includes a bellows attached to the top of the filter frame. The backflush filter apparatus includes a collapsible bellows member having a first opening attached to an aperture in a plate member, a second opening attached to the filter frame, and a compression plate positioned above the plate member and having a one-way valve. In the preferred embodiment of the present invention, the plate member is slidably mounted on at least one guide member which is mounted to the filter frame and the plate member is spring biased away from the filter frame so that the bellows is in an expanded configuration. The backflush procedure is achieved by stopping the pump, and moving the compression plate, using air cylinders or some other device, until it is against the plate member and thereby trapping fluid inside the bellows. The compression plate then forces the plate member along the guide members towards the filter frame, thereby collapsing the bellows and forcing the fluid in a reverse direction through the filter element and flushing any impurities from the filter element. As the compression plate retracts and the bellows expand to their normal operating positions, the one-way valve on the compression plate opens to prevent any suction of the removed particles back to the filter element.

20 Claims, 3 Drawing Sheets

HIGH EFFICIENCY BACKFLUSH SYSTEM FOR A FILTER

BACKGROUND OF THE INVENTION

1. Field of the Invention

The present invention relates generally to filter cleansing systems and, more specifically, to a high efficiency backflush filter apparatus that includes a bellows mounted on top of the filter screen.

2. Description of the Related Art

Filters are an essential component in most fluid flow systems. A wide variety of filter cleansing systems have been designed which allow the filter to be cleansed without removal of the filter from the system. One method of cleansing the filter in this manner is to backflush fluid through the filter to free the impurities from the filter and then allow the impurities to settle and be removed from the system. One way in which fluid is backflushed through a filter is by reversing the direction of the pump which is carrying the fluid through the system. In this type of a backflush system the backflush of fluid occurs at the same pressure as the suction of the fluid through the filter. Many times this pressure is insufficient to thoroughly cleanse the filter of impurities, thus resulting in an inefficient backflush. The inefficient design of the backflush system necessitates the use of small area filters which limits the overall flow through the filter.

Consequently there is a need for a system for efficiently cleansing a filter. The high efficiency backflush system for a filter should use a collapsible member to force fluid in a reverse direction through a filter element thereby flushing any impurities from the filter element. By using a collapsible member to force fluid through the filter element, the most effective backflush pressure may be achieved for any particular filter system design. The high efficiency backflush system for a filter should also be designed to prevent any suction of the removed particles back to the filter element after the backflush operation has flushed the filter element of impurities.

The following patent publications describe filter cleansing systems, but none of the following describe a filter cleansing system as effective as the present invention. None of the following patent publications describe a backflush system having the same structural elements and design simplicity as the present invention.

U.S. Pat. No. 3,278,034, issued on Oct. 11, 1966, to Robert E. West describes a washable swimming pool filter tank having a slide valve cylinder mounted concentrically within the filter tank and attached thereto in a permanent and completely leakproof manner.

U.S. Pat. No. 3,984,326, issued on Oct. 5, 1976, to Henry Bendel describes a gravity filtering equipment including a flushing device comprised of a movable bell to tightly enclose a compartment for backflush cleaning operation.

U.S. Pat. No. 4,486,307, issued on Dec. 4, 1984, to Walter Weiler describes a filter apparatus with a filter bed washing means comprised of a suction bell, the side walls of which define a compartment of the respective partial volume of the filter bed to be cleaned, which moves from one area of the filter bed to another.

U.S. Pat. No. 5,078,873, issued on Jan. 7, 1992, to Brent C. Black et al. describes a filter cleaning apparatus comprised of a moving hood sealed on a filtered compartment and using a pump to provide back flow for medium cleaning process.

United Kingdom Patent Application Number 7,550, published on Jan. 13, 1902, describes an improved filter arrangement designed to automatically actuate a reverse flow of liquid through the filter bed when the level of unfiltered liquid in the filter tank reaches a predetermined level.

German Patent Application Number 1,221,197, published on Jul. 21, 1966, and Soviet Union Patent Application Number 1,194,450 (A), published on Nov. 30, 1985, generally show filter backflush systems.

None of the above inventions and patents, taken either singularly or in combination, is seen to describe the instant invention as claimed. Thus a high efficiency backflush system for a filter solving the aforementioned problems is desired.

SUMMARY OF THE INVENTION

The present invention relates generally to filter cleansing systems. More specifically, the present invention is a high efficiency backflush filter apparatus positioned on the downstream side of a filter frame that includes a bellows attached to the top of the filter frame. The backflush filter apparatus includes a collapsible bellows member, having a first opening attached to an aperture in a plate member, a second opening attached to the filter frame, and a compression plate positioned above the plate member and having a one-way valve.

In the preferred embodiment of the present invention, the plate member is slidably mounted on one or more guide members which are mounted to the filter frame, and the plate member is spring-biased away from the filter frame so that the bellows is in an expanded configuration. The normal operating position is achieved when the bellows is in the expanded configuration and fluid is pumped through the filter element, through the bellows, through the aperture in the plate member and around the compression plate.

The backflush procedure is achieved by stopping the pump, and moving the compression plate, using air cylinders or some other device, until it is against the plate member and thereby trapping fluid inside the bellows. The compression plate then forces the plate member along the guide members towards the filter frame, thereby collapsing the bellows and forcing the fluid in a reverse direction through the filter element and flushing any impurities from the filter element. The compression plate may then be moved back to the normal operating position. As the compression plate retracts and the bellows expand to their normal operating positions, the one-way valve on the compression plate opens to prevent any suction of the removed particles back to the filter element.

Accordingly, it is a principal object of the invention to provide a system for efficiently cleansing a filter.

It is another object of the invention to provide a high efficiency backflush system for a filter that uses a collapsible bellows to force fluid in a reverse direction through a filter element, thereby flushing any impurities from the filter element.

It is a further object of the invention to provide a high efficiency backflush system for a filter that is designed to prevent any suction of the removed particles back to the filter element after the backflush operation has flushed the filter element of impurities.

It is an object of the invention to provide improved elements and arrangements thereof in a high efficiency backflush system for a filter for the purposes described which is inexpensive, dependable and fully effective in accomplishing its intended purposes.

3

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
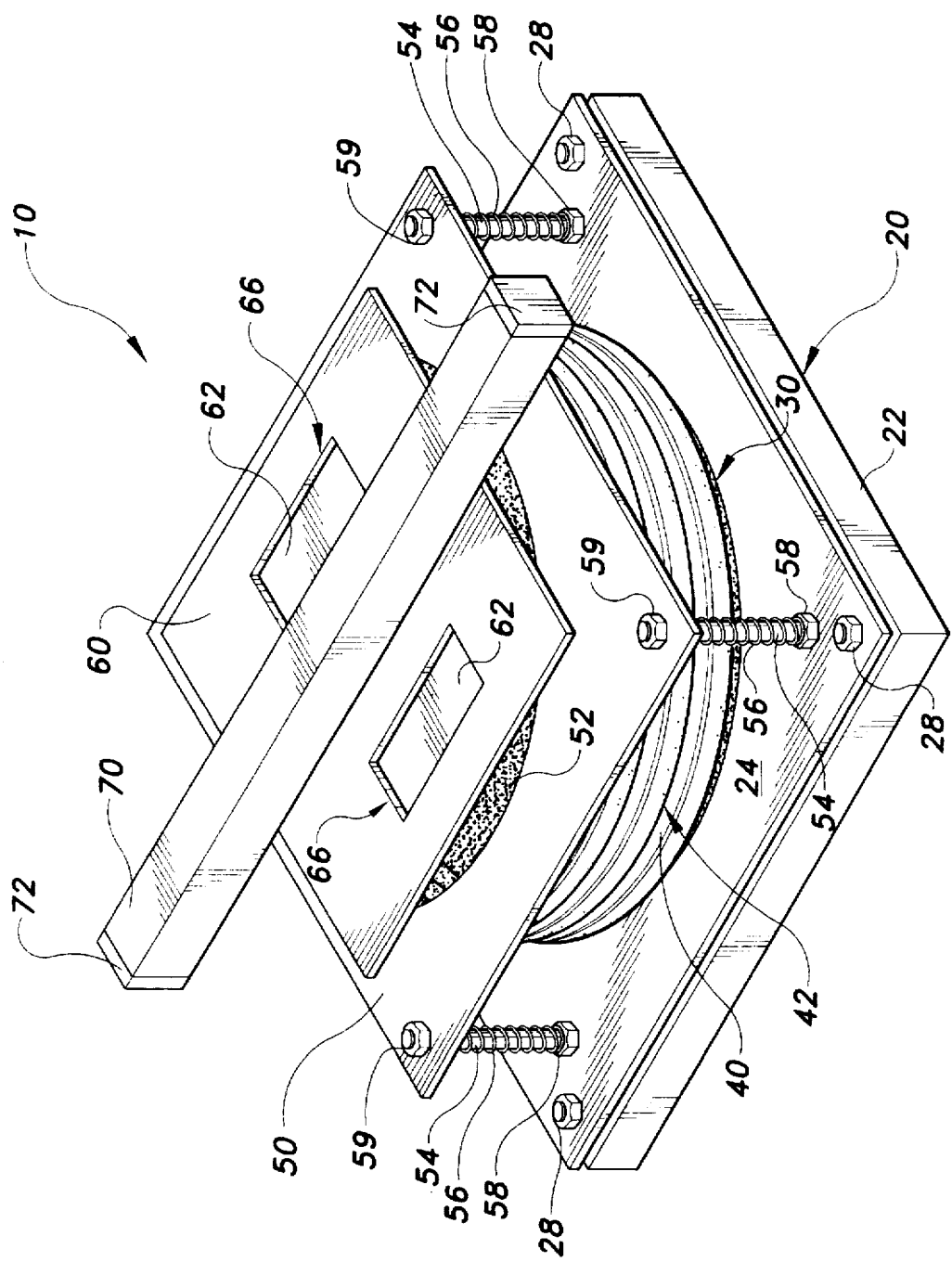
FIG. 1 is a perspective view of a high efficiency backflush system for a filter according to the present invention in the normal operating position.

The present invention is a high efficiency backflush filter apparatus 10 positioned on the downstream side of a filter frame 20. As shown in FIG. 1, the backflush filter apparatus 10 includes a collapsible member 40, such as a bellows, having a first opening attached to an aperture 52 in a plate member 50 and a second opening attached to the filter frame 20, and a compression plate 60 positioned above the plate member 50 and having one or more one-way valves 62.

Figure 2A:
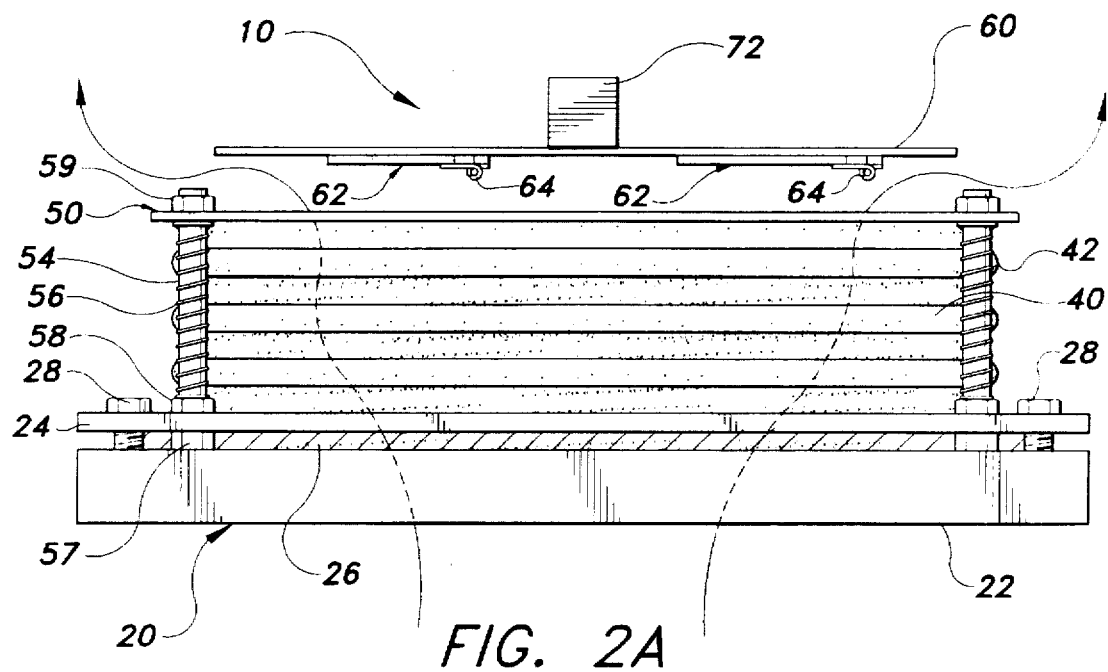
FIG. 2A is a side view of the filter in the normal operating position.

The present invention can either be constructed as an add-on feature for existing filter frames, or it may be constructed as part of a new filter apparatus. Referring to FIGS. 1 and 2A, the filter frame 20 includes a base frame 22, a filter element 26, and a plate 24. The filter element 26 is held in position between the base frame 22 and plate 24 by a plurality of corresponding nuts and bolts 28. The plate 24 has an aperture 30 through which fluid flows. The filter element 26 completely covers the aperture 30 to prevent impurities 12 from flowing through the aperture 30 and continuing downstream. The filter frame 20 may be mounted in any fluid duct or other suitable location in the fluid flow, as long as fluid is unable to flow around the filter frame 20. The base frame 22, filter element 26, plate 24, and aperture 30 may be constructed in any shape to conform to the design configuration of any fluid flow system.

In its most basic form, the backflush system includes a collapsible member 40, a plate member 50, and a compression plate 60. In the preferred embodiment of the present invention the plate member 50 is slidably mounted on one or more guide members 54 which are rigidly mounted to the filter frame 20 using bolts 57 and 58. The plate member 50 is spring biased away from the filter frame 20 by compression springs 56 mounted on the guide members 54 so that the collapsible member 40 is biased towards an expanded configuration. This biasing can also be achieved without the use of springs by manufacturing the collapsible member 40 from a resilient material. If a resilient collapsible member 40 is used the guide members may still be used, if desired, to help the plate member 50 and the collapsible member 40 move in the preferred manner. The plate member 50 is prevented from sliding off the end of the guide members 54 by a stopper bolt 59.

4

Figure 2B:
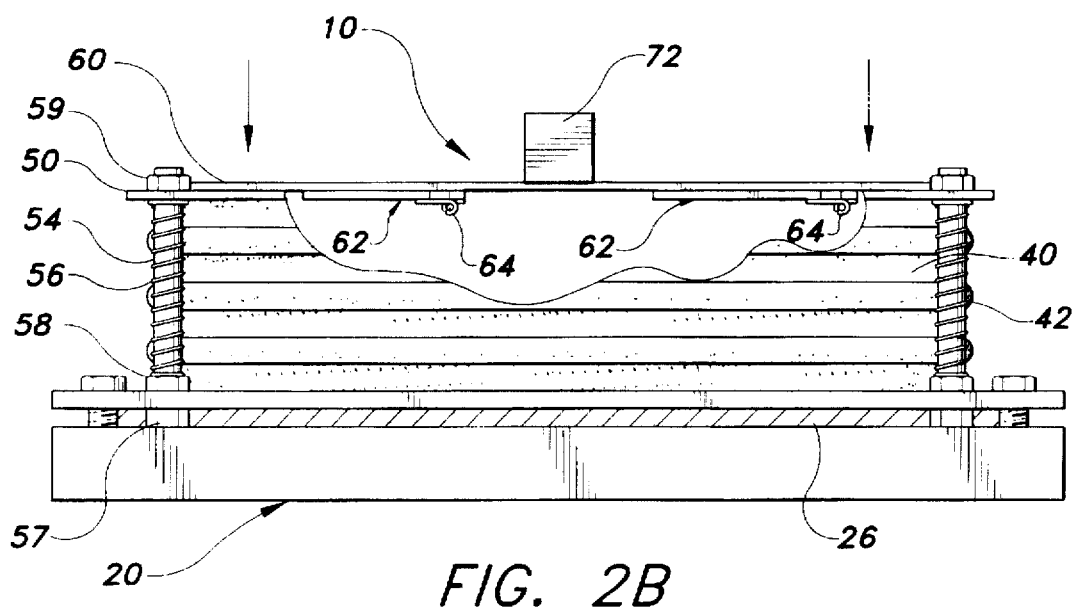
FIG. 2B is a side view of the filter with the compression plate sealed against the movable bellows plate and the reed valves in the closed position.
Figure 2C:
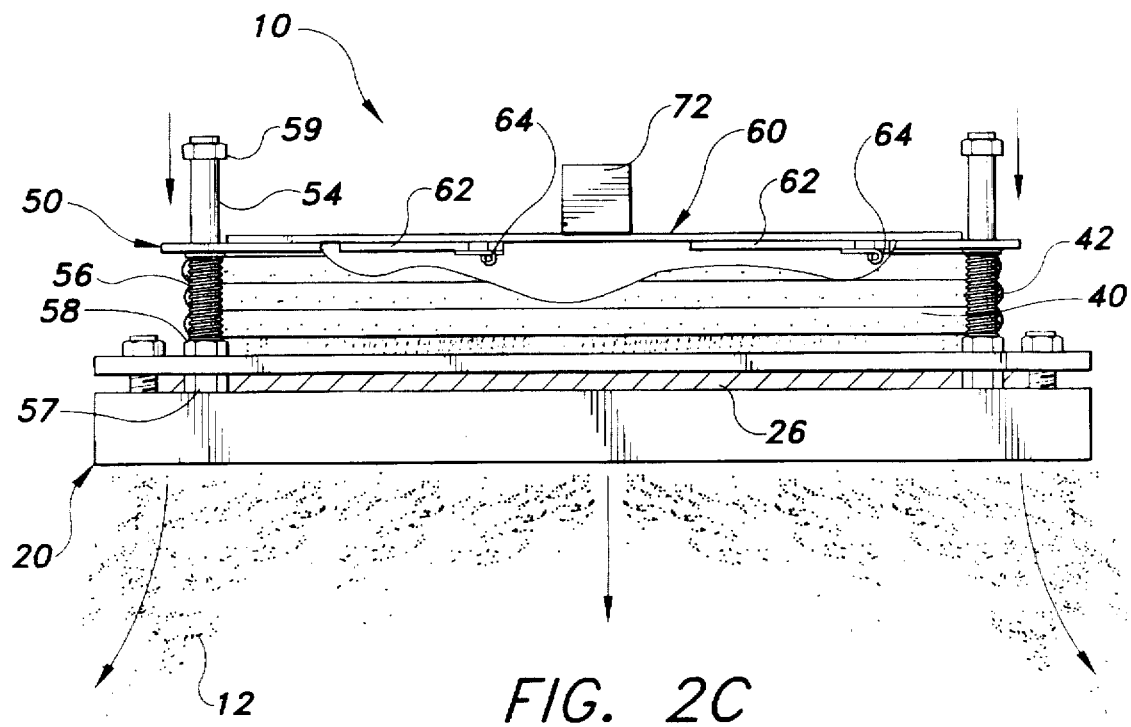
FIG. 2C is a side view of the filter with the compression plate at the farthest point of travel and with dirt from the filter being expelled.

The collapsible member 40 in the preferred embodiment is configured as a bellows. The collapsible member 40 has a series of ridges 42 which allow the collapsible member 40 to be compressed, as shown in FIG. 2C. The collapsible member 40 is preferably manufactured from a fluid impermeable material. The collapsible member 40 preferably has a generally cylindrical shape with an opening on either end. The first opening of the collapsible member 40 is attached to the aperture 52 through plate member 50, while the second opening is attached to the aperture 30 through plate 24.

The compression plate 60 is designed and configured to cover and seal the aperture 52 through plate member 50. In the normal operating position, as shown in FIG. 2A, the compression plate 60 is not sealed against the aperture 52 through plate member 50 which allows fluid to flow through the collapsible member 40 and passed the compression plate 60. A gasket (not shown) or other sealant may be attached to either the compression plate 60 or the plate member 50 in order to help seal the compression plate 60 over the aperture 52 through plate member 50. In the preferred embodiment of the present invention, the compression plate has two apertures 66 which are each covered by a one-way valve member 62. The valve members 62 are pivotally attached to the interior surface of the compression plate 60. Preferably the valve members 62 are biased towards the sealed position, as shown in FIG. 2A, by torsion springs 64. Other one-way valves may alternatively be used in place of those described herein.

In the preferred embodiment, a bar 70 having end sections 72 is rigidly attached to the compression plate 60. In the preferred embodiment an air cylinder (not shown) is attached to the bar either at the end sections 72 or directly to bar 70. The air cylinder acts as the actuating mechanism which controls the movement of the compression plate 60 as described in detail below. Other actuating mechanisms may alternatively be used in place of those described herein.

Figure 2D:
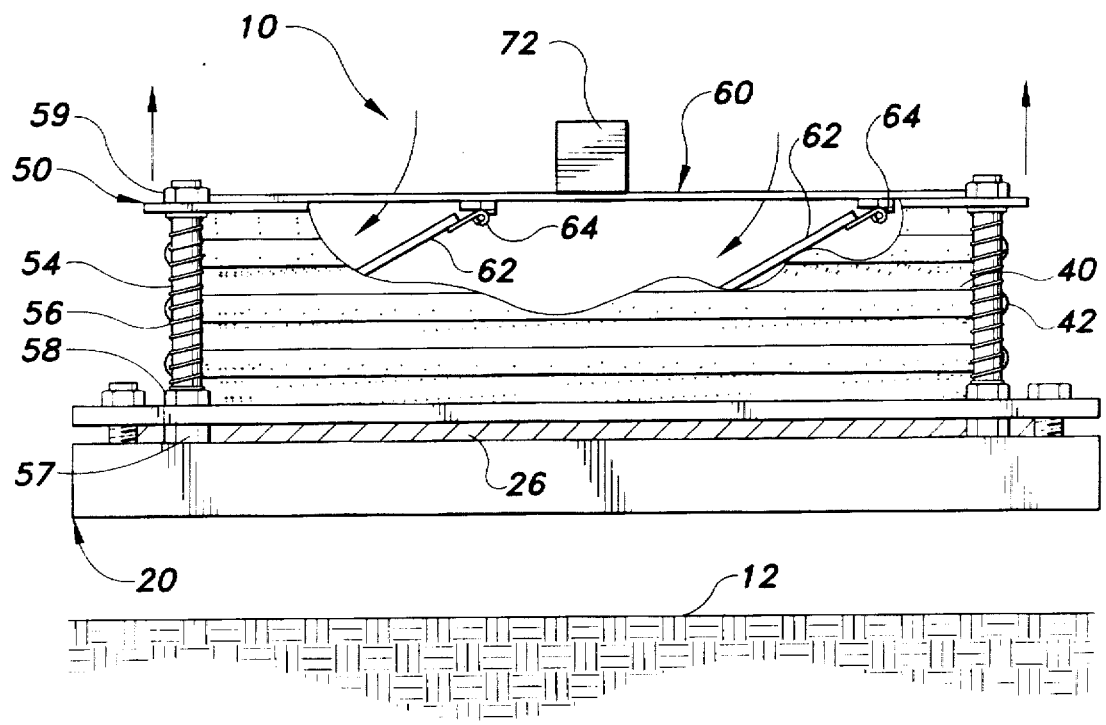
FIG. 2D is a side view of the filter with the compression plate moving upward with the reed valves in the open position and the dirt settling to the bottom.

The normal operating position, as shown in FIG. 2A, is achieved when the collapsible member 40 is in the expanded configuration, thereby allowing fluid to be pumped through the filter element 26, through the collapsible member 40, through the aperture 52 in the plate member 50, and around the compression plate 60. The backflush procedure is achieved by stopping the fluid pump (not shown), moving the compression plate 60, using air cylinders (not shown) or some other device, until it is against the plate member 50, as shown in FIG. 2B, thereby trapping fluid inside the collapsible member 40. The compression plate 60 then forces the plate member 50 along the guide members 54 towards the filter frame 20, thereby compressing the collapsible member 40 and forcing the fluid in a reverse direction through the filter element 26 and flushing any impurities 12 from the filter element 26, as shown in FIG. 2C. The compression plate 60 may then be moved back to the normal operating position. As the compression plate 60 retracts and the collapsible member 40 expands to their normal operating positions the one-way valve 62 on the compression plate 60 opens to prevent any suction of the removed particles back to the filter element 26, as shown in FIG. 2D. If the backflush system is constructed without a one-way valve 62, the compression plate 60 and the collapsible member 40 should be left in the compressed state, as shown in FIG. 2C, until the impurities 12 have time to settle so that the impurities 12 are not drawn back into the filter element 26 as the compression plate 60 is moved back to the normal operating position.

The speed and force at which the actuating mechanism presses on the compression plate 60 controls the pressure of the fluid as it is backflushed through the filter element 26. The filter element 26 may need to be reinforced using a screen (not shown) or other device to prevent the filter element 26 from tearing or rupturing during high pressure backflushing. By being able to control the pressure of the fluid as it is backflushed through the filter element 26, the operator has greater flexibility in choosing the size of the overall filter element area and the size of the pores in the filter element. The present invention does not require the filter element to be removed and cleansed or replaced, which thereby reduces the amount of maintenance and labor costs.

It is to be understood that the present invention is not limited to the embodiment described above, but encompasses any and all embodiments within the scope of the following claims.

I claim:

1. A backflush system for a filter mounted within a frame having an aperture, said backflush system comprising:

a collapsible member having a first opening and a second opening, said second opening adapted to be connected to the aperture in the frame;

a first member having an aperture, said first opening being connected to said aperture of said first member;

a second member dimensioned and configured to seal said aperture of said first member; and means for moving said second member into contact with said aperture of said first member, and compressing said collapsible member.

2. The backflush system as defined in claim 1, wherein said collapsible member is constructed of a fluid impermeable material.

3. The backflush system as defined in claim 1, wherein said collapsible member is a bellows.

4. The backflush system as defined in claim 1 wherein:

said second member has an aperture; and said second member has a third member movably attached thereto, said third member being dimensioned and configured to seal said aperture of said second member, said third member having an open position wherein said third member is in a non-sealed relationship with said aperture of said second member, and a closed position wherein said third member is in a sealed relationship with said aperture of said second member, said third member being in said closed position when said collapsible member compresses, and said third member being in said open position when said collapsible member expands.

5. The backflush system as defined in claim 4, including means whereby said third member is spring biased towards said closed position.

6. The backflush system as defined in claim 1, further comprising means for biasing said collapsible member towards an expanded position.

7. The backflush system as defined in claim 6, wherein said means for biasing said collapsible member towards an expanded position comprises said collapsible member being constructed of a resilient material.

8. The backflush system as defined in claim 6, wherein said means for biasing said collapsible member towards an expanded position comprises:

a guide member having a first end and a second end, said first end adapted to be fixedly mounted to the frame, said second end having a stop;

said second member having a hole corresponding to said guide member, said guide member extending through and being in a slidable relationship with said hole; and a cylindrically-shaped spring having a hollow axis, said guide member extending through said hollow axis, said spring being positioned between the frame and said second member.

9. The backflush system as defined in claim 1, further comprising:

a guide member having a first end and a second end, said first end adapted to be fixedly mounted to the frame, said second end having a stop; and said second member having a hole corresponding to said guide member, said guide member extending through and being in a slidable relationship with said hole.

10. The backflush system as defined in claim 1, wherein said means for moving said second member into contact with said aperture of said first member and compressing said collapsible member comprises an air cylinder connected to said second member.

11. A backflush filter comprising:

a filter frame having a first aperture;

a filter mounted within said frame;

a collapsible member having a first opening and a second opening, said second opening being connected to said first aperture;

a first member having a second aperture, said first opening being connected to said second aperture;

a second member dimensioned and configured to seal said second aperture; and means for moving said second member into contact with said second aperture and compressing said collapsible member.

12. The backflush filter as defined in claim 11, wherein said collapsible member is constructed of a fluid impermeable material.

13. The backflush filter as defined in claim 11, wherein said collapsible member is a bellows.

14. The backflush filter as defined in claim 11, wherein:

said second member has a third aperture; and said second member has a third member movably attached thereto, said third member being dimensioned and configured to seal said third aperture of said second member, said third member having an open position wherein said third member is in a non-sealed relationship with said third aperture of said second member and a closed position wherein said third member is in a sealed relationship with said third aperture of said second member, said third member being in said closed position when said collapsible member compresses, and said third member being in said open position when said collapsible member expands.

15. The backflush filter as defined in claim 14, including means whereby said third member is spring biased towards said closed position.

16. The backflush filter as defined in claim 11, further comprising means for biasing said collapsible member towards an expanded position.

17. The backflush filter as defined in claim 16, wherein said means for biasing said collapsible member towards an expanded position comprises said collapsible member being constructed of a resilient material.

18. The backflush filter as defined in claim 16, wherein said means for biasing said collapsible member towards an expanded position comprises:

a guide member having a first end and a second end, said first end being fixedly mounted to said frame, said second end having a stop;

said second member having a hole corresponding to said guide member, said guide member extending through and being in a slidable relationship with said hole; and a cylindrically-shaped spring having a hollow axis, said guide member extending through said hollow axis, said spring being positioned between said frame and said second member.

19. The backflush filter as defined in claim 11, further comprising:

a guide member having a first end and a second end, said first end being fixedly mounted to said frame, said second end having a stop; and said second member having a hole corresponding to said guide member, said guide member extending through and being in a slidable relationship with said hole.

20. The backflush filter as defined in claim 11, wherein said means for moving said second member into contact with said second aperture and compressing said collapsible member comprises an air cylinder connected to said second member.

* * * * *